(12) United States Patent
Voloskov (10) Patent No.: US 11,669,801 B2
(45) Date of Patent: Jun. 6, 2023

(54) THREE-DIMENSIONAL WAREHOUSE SYSTEM

(71) Applicant: Mikhail Voloskov, Dresden (DE)

(72) Inventor: Mikhail Voloskov, Dresden (DE)

(73) Assignee: Mikhail Voloskov, Dresden (DE)

( * ) Notice: Subject to any disclaimer, the term of this patent is extended or adjusted under 35 U.S.C. 154(b) by 0 days.

(21) Appl. No.: 16/033,699

(22) Filed: Jul. 12, 2018

(65) Prior Publication Data

US 2019/0026687 A1 Jan. 24, 2019

(30) Foreign Application Priority Data

Jul. 20, 2017 (EP) .................................. 17182336

(51) Int. Cl.
*G06Q 10/08* (2023.01)
*G06Q 10/087* (2023.01)
*B65G 1/04* (2006.01)

(52) U.S. Cl.
CPC ......... *G06Q 10/087* (2013.01); *B65G 1/0478* (2013.01); *B65G 1/0492* (2013.01)

(58) Field of Classification Search
CPC .. G06Q 10/087; B65G 1/0478; B65G 1/0492; B65G 1/04; B65G 1/1373; B65G 1/0407; G05B 15/02
USPC ......................................................... 705/28
See application file for complete search history.

(56) References Cited

U.S. PATENT DOCUMENTS

| 9,666,023 | B2* | 5/2017 | Irwin, Jr. ............ G07F 17/3225 |
| 2008/0269960 | A1* | 10/2008 | Kostmann ............ B65G 1/0407 701/2 |
| 2010/0228386 | A1* | 9/2010 | Kharkover ........... B65G 1/0478 700/218 |
| 2012/0251277 | A1 | 10/2012 | Corcoran |

(Continued)

FOREIGN PATENT DOCUMENTS

| CN | 1884013 | 12/2006 |
| CN | 104444007 | 3/2015 |

(Continued)

OTHER PUBLICATIONS

Office Action for Japanese Patent Application No. 2018-136664; Japanese Patent Office; dated Jul. 30, 2019.

(Continued)

*Primary Examiner* — Andrew Joseph Rudy
(74) *Attorney, Agent, or Firm* — Williams Mullen; Thomas F. Bergert (57) ABSTRACT

The present disclosure relates to a warehouse system (100) comprising a three-dimensional arrangement of storage spaces including a plurality of lanes extending in a longitudinal direction (X), a plurality of rows extending in a transverse direction (Z), and one or more levels in a vertical direction (Y). One or more cars (104) for carrying goods (106) are arranged in at least one of the plurality of rows, wherein the one or more cars (104) in a respective row are drivable along the respective row in the transverse direction (Z), and wherein the number of the one or more cars (104) in the respective row is less than the number of the plurality of lanes. The warehouse system (108) comprises at least one shuttle (108) drivable to shift goods (106) along at least one of the plurality of lanes in the longitudinal direction (X).

17 Claims, 6 Drawing Sheets

(56) References Cited

U.S. PATENT DOCUMENTS

| | | | | |
|---|---|---|---|---|
| 2014/0086714 | A1* | 3/2014 | Malik | B65G 1/0478 414/273 |
| 2015/0225187 | A1 | 8/2015 | Razumov | |
| 2016/0145043 | A1* | 5/2016 | Van Den Berk | G05B 15/02 700/217 |
| 2016/0350752 | A1* | 12/2016 | Turbides | G06Q 20/356 |
| 2019/0291955 | A1* | 9/2019 | Bastian, II | B65G 1/1373 |

FOREIGN PATENT DOCUMENTS

| | | |
|---|---|---|
| CN | 206172328 | 5/2017 |
| DE | 3808594 | 9/1989 |
| DE | 202006002586 | 4/2006 |
| DE | 102009017241 | 10/2010 |
| EP | 0109950 | 5/1984 |
| EP | 0589844 | 3/1994 |
| EP | 2361855 | 8/2011 |
| JP | 1974003307 | 12/1974 |
| JP | 1975089009 | 7/1975 |
| JP | S63154502 | 6/1988 |
| JP | 1996157016 | 6/1996 |
| WO | 2005118436 | 12/2005 |
| WO | 2009132687 | 11/2009 |
| WO | 2014204300 | 12/2014 |
| WO | 2015115965 | 8/2015 |
| WO | 2015185628 | 12/2015 |
| WO | 2015189849 | 12/2015 |
| WO | 2016167713 | 10/2016 |

OTHER PUBLICATIONS

Office Action for Patent Application No. 2018126455/11 (041903); Russian Patent Office; dated Mar. 5, 2019.

Extended European Search Report for EP App No. 17182336.2, European Patent Office, dated Apr. 12, 2018.

Office Action for Chinese Patent Application No. 201810791824.3, China National Intellectual Property Administration, dated Apr. 3, 2020.

* cited by examiner

THREE-DIMENSIONAL WAREHOUSE SYSTEM

CROSS-REFERENCE TO RELATED APPLICATION

This application claims priority under 35 U.S.C. 119 to European Application No. 17182336.2 filed on Jul. 20, 2017, the disclosure of which is incorporated by reference herein in its entirety.

TECHNICAL FIELD

The present disclosure generally relates to the field of warehouse systems. More particularly, the present disclosure relates to a warehouse system comprising a three-dimensional arrangement of storage spaces, a method for retrieving goods from a particular storage space in the warehouse system as well as a shuttle for retrieving goods in the warehouse system.

BACKGROUND AND SUMMARY

In the industry, warehouses are used to store large amounts of goods in an organized manner. Warehouse systems typically employed nowadays encompass a variety of types of storage systems ranging from simple pallet racks, allowing the storage of palletized goods in horizontal rows with multiple levels, to high bay warehouses, allowing the storage of goods in heights of up to 50 meters, for example. Stacker cranes movable in lanes between two opposing rack fronts are typically employed to supply the racks with goods. The space necessary for these lanes is generally lost for the storage of goods, however, and, therefore, these types of systems do not provide an optimal usage of space available in a warehouse.

Compact warehouse systems are another type of storage systems which focus on the efficient use of available space in a warehouse. One example of compact warehouse systems are automated channel storage systems in which multiple storage spaces are provided in the depth of a rack in the form of channels accessible from the front or the back of the rack. Channel vehicles, so called shuttles, are used to move goods within the channels. An exemplary channel storage system is described in WO 2009/132687 A1, for example. In channel storage systems, however, goods within a channel can only be stored and retrieved in a first-in first-out (FIFO) or last-in first-out (LIFO) manner and it is thus not possible to directly access goods at any desired storage space within a channel, such as in the middle of a full channel, for example.

It is thus an object of the present disclosure to provide warehouse system techniques that avoid at least one of these, or other, problems.

According to a first aspect, there is provided a warehouse system comprising a three-dimensional arrangement of storage spaces including a plurality of lanes extending in a longitudinal direction, a plurality of rows extending in a transverse direction, and one or more levels in a vertical direction. One or more cars for carrying goods are arranged in at least one of the plurality of rows, wherein the one or more cars in a respective row are drivable along the respective row in the transverse direction, and wherein the number of the one or more cars in the respective row is less than the number of the plurality of lanes. The warehouse system comprises at least one shuttle drivable to shift goods along at least one of the plurality of lanes in the longitudinal direction.

Due to the three-dimensional structure, the warehouse system may also be called a cubic warehouse system. From the viewpoint of the lanes, each of the plurality of lanes may provide storage spaces one after another in the longitudinal direction of the warehouse system, wherein the number of storage spaces per lane corresponds to the number of the plurality of rows. Similarly, from the viewpoint of the rows, each of the plurality of rows may provide storage spaces one after another in the transverse direction of the warehouse system, wherein the number of storage spaces per row corresponds to the number of the plurality of lanes. In other words, the warehouse system may provide a three-dimensional matrix of storage spaces, wherein, at each intersection of the plurality of lanes and the plurality of rows on a level, a storage space is formed. The longitudinal direction may correspond to a horizontal length of the warehouse system and the transverse direction may correspond to a horizontal width of the warehouse system.

In order to store goods at the storage spaces of the warehouse system, cars for carrying the goods may be employed. Each car may be dimensioned to fit into one storage space and a plurality of cars may be arranged one after another in both lane and row directions (i.e., one car per storage space). The one or more cars in a respective row may be arranged to be drivable (or, more generally, to be movable) along the row in the transverse direction. The number of cars arranged in each row may be less than the number of the plurality of lanes. In this way, it may be ensured that each row at any time comprises at least one free storage space (i.e., a storage space where no car is placed) which can be used to temporarily relocate the cars in the respective row in the transverse direction so that a path in a lane required by a shuttle to access a particular storage space in the longitudinal direction may be cleared. Each car may optionally comprise a removable tray on which the goods may be placed. Goods themselves may be palletized.

While cars may be used to shift goods in the transverse direction of the warehouse system, shuttles may be used to shift goods in the longitudinal direction of the warehouse system. The warehouse system may thus comprise at least one shuttle which is drivable (or, more generally, movable) to shift goods along at least one (preferably each) of the plurality of lanes in the longitudinal direction. The at least one shuttle may pick up goods from a car in a respective lane and shift the goods along the lane as needed. In one variant, the at least one shuttle may comprise a warehouse-wide shuttle which may be relocated between different lanes as well as different levels of the warehouse system. In another variant, the at least one shuttle may comprise level-wide shuttles which may be relocated between different lanes on the same level, but not between different levels. In both variants, relocation of the shuttles in the transverse direction from one lane to another may be carried out through movement of the respective shuttle along a free row of the warehouse system in the transverse direction. The free row may be a dedicated row serving for the purpose of transferring shuttles in the transverse direction which may not be used for the storage of goods. Lifts, on the other hand, may be used to relocate a shuttle from one level to another. In still another variant, the at least one shuttle may comprise separate shuttles for each of the plurality of lanes. In this variant, shuttles do not need to be relocated at all and free rows for relocating the shuttles in the transverse direction may not be required.

When goods are to be retrieved by a shuttle from a particular storage space, it may happen that, in the lane of the particular storage space, other storage spaces may be occupied (by cars and/or goods) that prevent the shuttle from shifting the goods from the particular storage space to an end of the lane, where the goods may be transferred further in other directions as needed. In such a situation, the goods are to be retrieved from a storage space which is not an outermost occupied storage space in a lane. To gain access to the particular storage space for transfer of the goods by the shuttle, a path required to shift the goods by the shuttle from the particular storage space to the end of the lane must be cleared. The warehouse system may thus comprise a control system, such as a warehouse management computer, for example, which, in order to retrieve goods from a particular storage space, may be configured to drive the one or more cars in at least one of the plurality of rows to clear a path in the lane of the particular storage space enabling the at least one shuttle to shift the goods along the lane in the longitudinal direction from the particular storage space to an end of the lane, and drive the at least one shuttle to shift the goods along the cleared path from the particular storage space to the end of the lane.

Clearing the path in the lane of the particular storage space may be carried out in various ways. In one variant, clearing the path in the lane of the particular storage space may comprise driving, for each row from the end of the lane to (but not including) the particular storage space (i.e., including the row at the end of the lane, but excluding the row of the particular storage space), at least one car of the one or more cars in the respective row by at least one storage space in the transverse direction so that the lane of the particular storage space is cleared in the respective row. The cars in each row may be driven in the transverse direction in parallel so that the path in the lane of the particular storage space may be cleared in just a single driving step.

In one variant of the warehouse system, the number of the one or more cars in each of the plurality of rows may be exactly one less than the number of the plurality of lanes. In a particular such variant, among the plurality of lanes, a particular lane may be empty before clearing the path in the lane of the particular storage space, wherein driving the at least one car in the transverse direction shifts a particular car among the one or more cars in the respective row into the particular lane. The particular lane may be a dedicated lane used for temporary storage of cars until retrieving of goods from a particular storage space is complete. The particular lane may be an outermost lane of the warehouse system and the particular car may be an outermost car among the one or more cars in the respective row, for example. When retrieving is complete, the temporarily shifted cars may be shifted back as the cleared path is no longer needed.

In another variant, it is also conceivable that more than one lane among the plurality of lanes is empty for temporary storage of cars. Although this may result in non-optimal use of space in the warehouse system, it may increase throughput when a large number of goods is to be retrieved from the warehouse system simultaneously. Also, it will be understood that, rather than a particular lane which may be empty across all rows, it may be sufficient that each row has at least one empty storage space, while the empty storage spaces of the different rows may be available on different lanes. In this case, provided that cars can be driven independently from each other, shifted cars do not necessarily have to be shifted back to their initial position which may help to save energy.

For driving the cars, various realizations of driving mechanisms are conceivable. For example, each car may have a separate driving device installed at the respective car which may be controlled by the control system, e.g., through signals transmitted to the respective car via wireless transmission. In another variant, only a subset of cars (e.g., only one car) among the one or more cars in a respective row may be drivable, wherein the subset of cars may be releasably coupled to the remaining (non-drivable) cars in the respective row so that the remaining cars can be driven indirectly via the subset of cars. In one particular variant, an outermost car in the respective row may form the subset of cars. In such a case, rather than by a driving device installed at the car, the outermost car may be driven by a driving device (e.g., a linear drive) installed at an end of the respective row, wherein the driving device may be coupled to the outermost car. Before clearing the path in the lane of the particular storage space (i.e., in a normal storage state), the one or more cars in the respective row may be releasably coupled to one another and, when clearing the path, the at least one car which is driven in the transverse direction may be uncoupled from the remaining cars in the respective row while the remaining cars remain at their positions.

It will be understood that, for the driving devices mentioned above, different drive technologies may be used. While electric motors may be one feasible variant, other technologies may be employed, such as magnetic drives including magnetic linear drives, for example. Also, it will be understood that control signals may not necessarily have to be communicated to the cars via wireless transmission. Since, in the normal storage state, the cars in a row may be coupled to one another, wire bound transmission of control signals from one car to another may be conceivable as well. Wire based power supply may be realized in the same manner. The coupling between two adjacent cars may be implemented by a magnetic or a mechanical connection which may be released upon receipt of a corresponding uncoupling signal from the control system.

As described above, in the warehouse system of the present disclosure, cars may be used to shift goods in the transverse direction of the warehouse system and shuttles may be used to shift goods in the longitudinal direction of the warehouse system. To realize such linear movability, the cars may be rail guided and comprise rollers engageable in rails extending along the plurality of rows in the transverse direction. The at least one shuttle may be rail guided as well and comprise rollers engageable in rails extending along the plurality of lanes in the longitudinal direction. To avoid crossings of the rails of the cars and the rails of the shuttles, one of the rails of the cars and the rails of the shuttles may extend at the bottom of the plurality of rows or lanes, and the other one of the rails of the cars and the rails of the shuttles may extend at the top of the plurality of rows or lanes, respectively.

In one particular such variant, the one or more cars arranged in a respective row may be rail guided using rails extending at the bottom of the respective row and the at least one shuttle may be rail guided using rails extending at the top of the plurality of lanes. The at least one shuttle may then be configured to pick up goods from a car by lifting, when the shuttle is positioned above the car, the goods to an extent that allows the goods to be shifted in the longitudinal direction of the respective lane. The goods may be placed on a removable tray on the car, wherein the at least one shuttle may comprise one or more gripping arms extending downwards for lifting the tray from the car. The shuttle and its characteristics will be described in more detail below with reference to a shuttle for retrieving goods in a warehouse system according to the third aspect of the present disclosure.

In the above description, reference to the plurality of lanes and the plurality of rows of the warehouse system was mainly made by referring to a single level of the warehouse system. It will be understood, however, that the storage spaces of the warehouse system may be organized into a plurality of levels in the vertical direction. In this case, the warehouse system may comprise at least one lift drivable to transfer goods from one of the plurality of levels to another one of the plurality of levels. When employing warehouse-wide shuttles, the at least one lift may also be usable to transfer the at least one shuttle from one level to another. In a further variant, the warehouse system may comprise at least two groups of lifts, wherein one of the at least two groups of lifts may exclusively be used for storing new goods in the warehouse system and another one of the at least two groups of lifts may exclusively be used for retrieving stored goods from the warehouse system. In such a variant, it is conceivable that one group of lifts is arranged at one side of the warehouse system (e.g., at a side at which new goods are fed into the warehouse system) and another group is arranged at another side of the warehouse system (e.g., at a side at which retrieved goods are fed out of the warehouse system). A group of lifts may comprise a plurality of lifts, but may also be made up of a single lift only. In this way, an efficient transfer of goods (or shuttles) between the levels of the warehouse system may be achieved.

To further enhance efficiency of transfer between levels, it will be understood that more than two lifts can generally be used in the warehouse system, up to the number of the plurality of lanes or the number of the plurality of rows, for example. It is even conceivable that lifts are provided on all four sides of the warehouse system so that the total quantity of lifts may correspond to twice the number of the plurality of lanes plus twice the number of the plurality of rows. This may especially be helpful in case the warehouse system has a large number of levels, similar to high bay warehouses, where the vertical movement of goods commonly forms a bottleneck.

According to a second aspect, there is provided a method for retrieving goods from a particular storage space in a warehouse system comprising a three-dimensional arrangement of storage spaces including a plurality of lanes extending in a longitudinal direction, a plurality of rows extending in a transverse direction, and one or more levels in a vertical direction. In the warehouse, one or more cars for carrying goods are arranged in at least one of the plurality of rows, wherein the one or more cars in a respective row are movable along the respective row in the transverse direction, and wherein the number of the one or more cars in the respective row is less than the number of the plurality of lanes. The warehouse system comprises at least one shuttle movable to shift goods along at least one of the plurality of lanes in the longitudinal direction. The method comprises moving the one or more cars in at least one of the plurality of rows to clear a path in the lane of the particular storage space enabling the at least one shuttle to shift the goods along the lane in the longitudinal direction from the particular storage space to an end of the lane, and moving the at least one shuttle to shift the goods along the cleared path from the particular storage space to the end of the lane.

The method according to the second aspect may correspond to the method steps performed by the control system of the warehouse system according to the first aspect. Thus, the features described herein with reference to the warehouse system of the first aspect may also be embodied in the steps of the method of the second aspect, where applicable. Unnecessary repetitions are thus omitted in the following.

As in the first aspect, clearing the path in the lane of the particular storage space may comprise moving, for each row from the end of the lane to the particular storage space, at least one car of the one or more cars in the respective row by at least one storage space in the transverse direction so that the lane of the particular storage space is cleared in the respective row. Among the plurality of lanes, a particular lane may be empty before clearing the path in the lane of the particular storage space, wherein moving the at least one car in the transverse direction may shift a particular car among the one or more cars in the respective row into the particular lane.

According a third aspect, there is provided a shuttle for retrieving goods in a warehouse system comprising a three-dimensional arrangement of storage spaces including a plurality of lanes, a plurality of rows, and one or more levels. The shuttle is configured to be movable along at least one of the plurality of lanes at a top of the at least one lane, wherein goods in a storage space are disposed at the bottom of the storage space. The shuttle is configured to pick up the goods by lifting the goods from the bottom of the storage space when the shuttle is positioned above the goods.

The shuttle according to the third aspect may correspond to the at least one shuttle of the warehouse system of the first aspect, and the warehouse system in which the shuttle according to the third aspect is used may correspond to the warehouse system of the first aspect. Thus, those features described above in relation to the at least one shuttle and the warehouse system of the first aspect may be comprised by shuttle and the warehouse system according to the third aspect as well, and vice versa. Unnecessary repetitions are thus omitted in the following.

As in the first aspect, the shuttle may comprise rollers engageable in rails extending at the top of the at least one lane. For driving purposes, the shuttle may comprise a driving device configured to drive the rollers to move the shuttle along the at least one lane. The driving device may be controlled by a control system of the warehouse system, e.g., through signals transmitted to the shuttle via wireless transmission. The driving device may be an electric motor, for example, but may also be based on other drive technologies, such as magnetic drive technologies, for example.

The shuttle may comprise one or more gripping arms extending downwards from a platform of the shuttle for lifting the goods from the bottom of the storage space. In one variant, each of the one or more gripping arms may comprise a rod extending downwards from the platform of the shuttle, wherein the rod comprises a jaw and at a lower end thereof. The rod may be rotatable about its longitudinal axis so as to turn the jaw to grip the goods (e.g., via a pallet or a tray on which the goods are placed). The shuttle may comprise an actuator, such as an electrical actuator, which is configured to rotate the rod to either grip or release the goods. When the shuttle comprises at least two gripping arms, the actuator may be configured to rotate the rods of the at least two gripping arms simultaneously. In such a case, there may be no need for separate actuators for each gripping arm and, rather, all gripping arms may be served by the same actuator.

The shuttle may further comprise a lifting device for lifting the goods when the one or more gripping arms grip the goods. The shuttle may in this case comprise an upper platform and a lower platform, wherein one of the upper and lower platform may be liftable with respect to the other one of the upper and lower platform using the lifting device, and wherein the one or more gripping arms may be fixed to the liftable platform. In one such variant, the rollers of the shuttle may be mounted to the lower platform and the lower platform may thus be fixed in height when the rollers engage the rails extending at the top of the at least one lane. The upper platform may then be liftable with respect to the lower platform using the lifting device, wherein the one or more gripping arms may be fixed to the upper platform so that the gripping arms are lifted together with the upper platform. The lifting device may be an electrically drivable lifting jack, for example.

When picking up the goods from the bottom of the storage space (e.g., from a car positioned at the storage space, as described above), the shuttle may be configured to lift the goods to an extent that allows the goods to be shifted by the shuttle along the at least one lane above the bottom of the at least one lane. This extent may be a minimal distance that is sufficient to shift the goods along the at least one lane without contacting elements at the bottom of the at least one lane. When the goods are placed on a removable tray at the bottom of the storage space (e.g., a removable tray placed on a car, as described above), the shuttle may be configured to lift the tray together with the goods. The goods may optionally be palletized.

BRIEF DESCRIPTION OF THE DRAWINGS

In the following, the present disclosure will further be described with reference to exemplary implementations illustrated in the figures, in which.

DETAILED DESCRIPTION

In the following description, for purposes of explanation and not limitation, specific details are set forth in order to provide a thorough understanding of the present disclosure. It will be apparent to one skilled in the art that the present disclosure may be practiced in other implementations that depart from these specific details.

Figure 1:
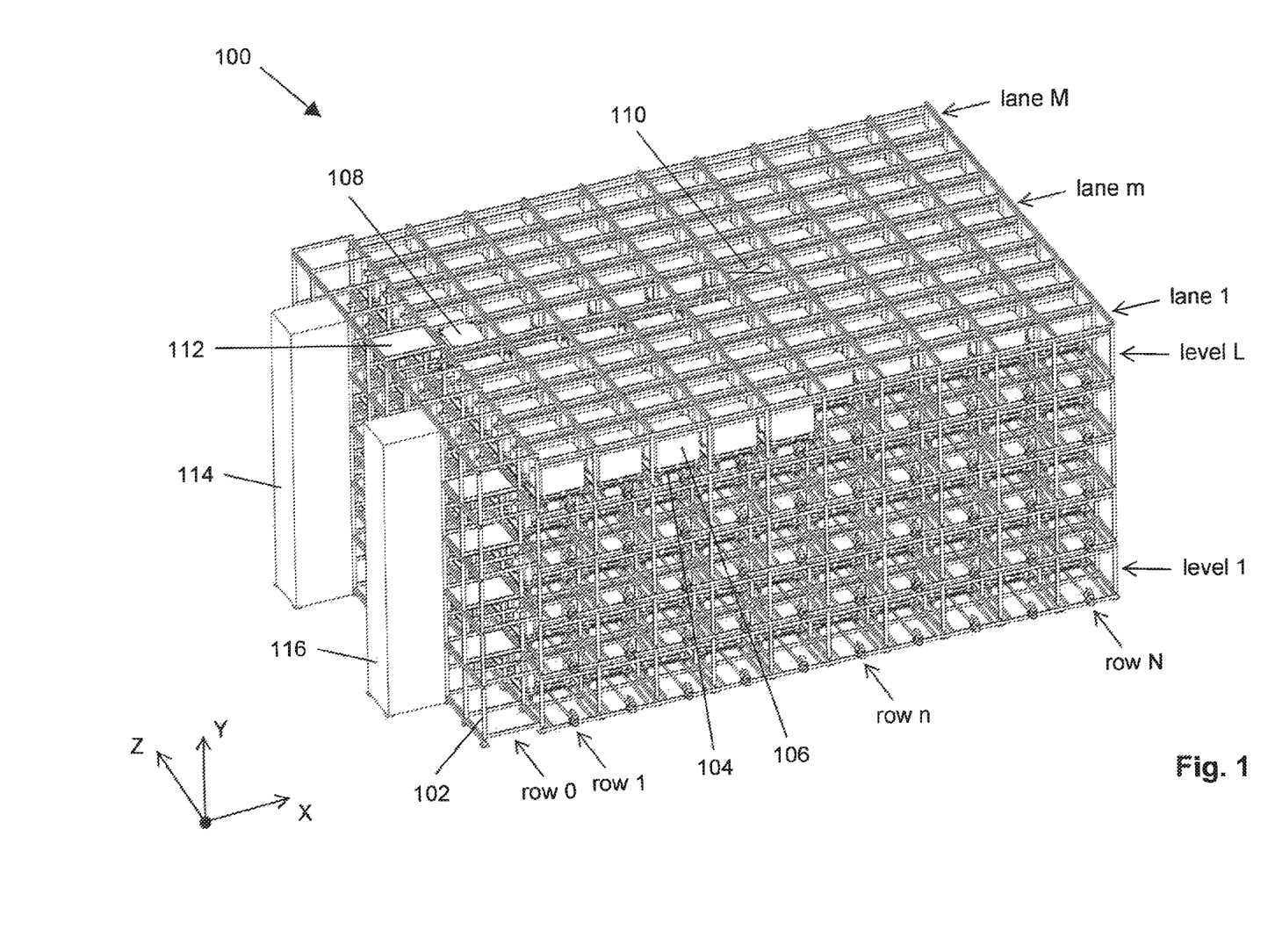
FIG. 1 illustrates a perspective view of a warehouse system comprising a three-dimensional arrangement of storage spaces according to the present disclosure.

FIG. 1 illustrates a perspective view of an exemplary warehouse system 100 which comprises a three-dimensional arrangement of storage spaces including a plurality of lanes extending in a longitudinal direction X, a plurality of rows extending in a transverse direction Z, and one or more levels in a vertical direction Y of the warehouse system 100. The warehouse system 100 is formed by a rack frame structure 102 and, due to its three-dimensional structure, the warehouse system 100 may also be called a cubic warehouse system. In FIG. 1, the number of lanes is denoted by M, the number of rows is denoted by N, and the number of levels is denoted by L. From the viewpoint of the lanes, each of the lanes provides storage spaces one after another in the longitudinal direction X, beginning at row 1 and ending at row N. Similarly, from the viewpoint of the rows, each of the rows provides storage spaces one after another in the transverse direction Z, beginning at lane 1 and ending at lane M. The plurality of levels ranges from level 1 to level L.

In order to store goods at the storage spaces of the warehouse system 100, cars 104 for carrying goods 106 (better visible in the detailed view of FIG. 3) may be employed in each row. Each car 104 may be dimensioned to fit into one storage space and a plurality of cars 104 may be arranged one after another in both lane and row directions (i.e., one car per storage space). The cars 104 in a row are drivable along the row in the transverse direction Z. In the example of FIG. 1, the number of cars 104 arranged in each row is exactly one less than the number of lanes M. In this way, it is ensured that each row at any time comprises at least one free storage space (i.e., a storage space where no car is placed) which can be used to temporarily relocate the cars 104 in a respective row in the transverse direction Z so that a path in a lane required by a shuttle to access a particular storage space in the longitudinal direction X may be cleared. Such situation is shown in the example of FIG. 1 at level L, where a shuttle 108 is ready to be driven along lane m in the longitudinal direction X to pick up goods from a particular storage space 110 (indicated by a cross "X" in the figures). On levels 1 to L−1, on the other hand, all cars 104 are in a normal storage state, i.e., all cars 104 are carrying goods 106 and are parked in the storage spaces in rows 1 to N of lanes 2 to M. A normal storage state of a level may be said to be a state in which lane 1 is empty on that level. Lane 1 may thus be used as temporary storage space for those rows in which a path needs to be cleared, as explained above.

In FIG. 1, only one shuttle 108 is visible. The shuttle 108 may be a warehouse-wide shuttle which may be relocated between different lanes as well as different levels of the warehouse system 100. Relocation of the shuttle 108 in the transverse direction Z from one lane to another may be carried out through a temporary movement along row 0 which serves for the purpose of transferring shuttles in the transverse direction Z and which may not be used for storing goods. A transfer of the shuttle 108 in row 0 from one lane to another may be carried out using a docking station 112 (better visible in the detailed view of FIG. 3). The docking station 112 may be used to transfer the shuttle 108 to one of the lifts 114 and 116 (indicated schematically only) as well which, in turn, may be driven to transfer the shuttle 108 to other levels. As may be seen in FIG. 1, docking stations are also provided on other levels in row 0 to transfer shuttles on these levels in the transverse direction Z in an equivalent manner. In another variant, the shuttle 108 may be a level-wide shuttle (e.g., the warehouse system 100 may comprise one or more shuttles per level) which may be relocated between different lanes on the same level, as described above, but not between different levels. In still another variant, the warehouse system 100 may comprise separate shuttles for each of the plurality of lanes. In such a variant, relocation of shuttles between different lanes via row 0 may not be required at all. Goods could then be transferred at the end of the lanes (i.e., at row 1) to stacker cranes, for example. Thus, in such a case, row 0 and the lifts 114 and 116 may not be needed at all. In the example of FIG. 1, for an efficient transfer between levels in the warehouse system 100, one of the lifts 114 and 116 may exclusively be used for storing new goods in the warehouse system 100 and the other one of the lifts 114 and 116 may exclusively be used for retrieving stored goods from the warehouse system 100.

Figure 2:
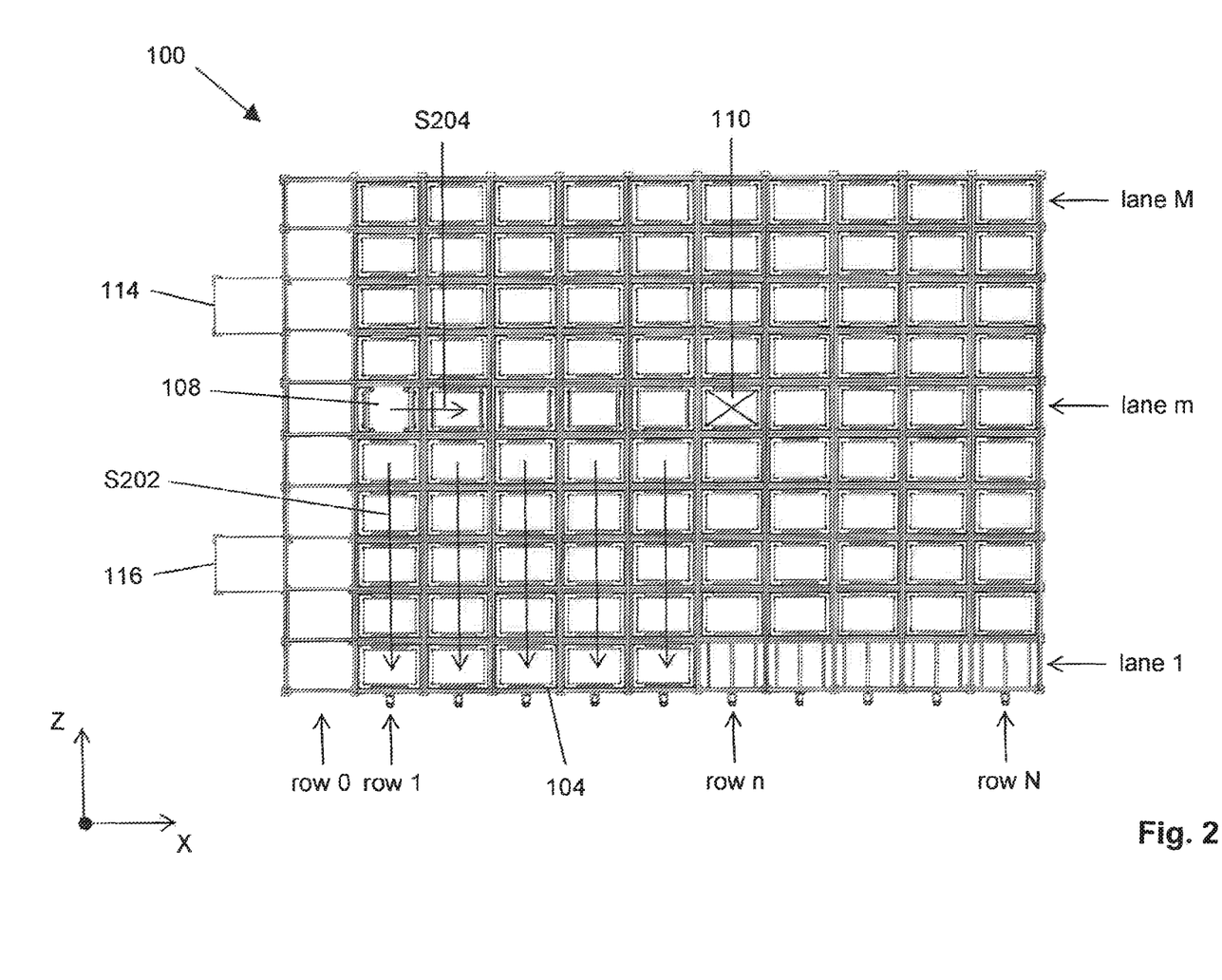
FIG. 2 illustrates a top view of the warehouse system of FIG. 1 indicating steps performed in a method for retrieving goods from a particular storage space in the warehouse system.

FIG. 2 illustrates a top view of the warehouse system 100 and indicates steps performed in a method for retrieving goods from the particular storage space 110 in the warehouse system 100. Generally, when goods are to be retrieved by a shuttle from a particular storage space, such as the particular storage space 110, it may happen that, in the lane of the particular storage space, other storage spaces may be occupied that prevent the shuttle from shifting the goods from the particular storage space to the end of the lane where the goods may be transferred further in other directions as needed. In such a situation, goods are to be retrieved from a storage space which is not an outermost occupied storage space in a lane. To gain access to the particular storage space for transfer of the goods by the shuttle, a path required to shift the goods by the shuttle from the particular storage space to the end of the lane must be cleared.

In FIG. 2, a state is shown in which the path in lane m required by the shuttle 108 to retrieve goods from the particular storage space 110 has already been cleared. In the state illustrated, the shuttle 108 has not yet been driven to the particular storage space 110 to pick up the goods (cf. the same situation in FIG. 1). The particular storage space 110 from which the goods are to be retrieved is the storage space at lane m, row n and level L of the warehouse system 100.

Prior to the state shown in FIG. 2, all cars 104 on level L have been parked in the storage spaces in rows 1 to N of lanes 2 to M, whereas lane 1 was empty. To enable the shuttle 108 to shift the goods along lane m in the longitudinal direction X from the particular storage space 110 to the end of lane m (i.e., row 0 or row 1), a corresponding path in lane m had to be cleared. Thus, in a first step S202 (indicated by arrows pointing in the transverse direction Z in FIG. 2), the cars 104 which were initially parked in lanes 2 to M (i.e., in the normal storage state) were driven by one storage space in the transverse direction Z so that, after performing step S202, these cars 104 were positioned in lanes 1 to m−1. This movement of the cars was performed for each row from the end of lane m to (but not including) the particular storage space 110, i.e., for rows 1 to n−1. In this way, a path in lane m has been cleared from rows 1 to n−1, thereby enabling the shuttle 108 to access the particular storage space 110 and to shift goods along lane m in the longitudinal direction X from the particular storage space 110 to the end of lane m. In step S202, all cars 104 in rows 1 to n−1 were driven in the transverse direction Z in parallel so that the path in lane m was cleared in just a single driving step.

Thereafter, in step S204 (indicated by an arrow pointing in the longitudinal direction X in FIG. 2), the shuttle 108 may be driven to the particular storage space 110, where the shuttle 108 may pick up the desired goods and shift the goods along the cleared path from the particular storage space 110 to the end of lane m. For example, the shuttle 108 may be driven until row 0, where the shuttle 108 may be received by the docking station 112 which, in turn, may transfer the shuttle 108 to one of the lifts 114 and 116. The lift may then be used to transfer the goods from level L to another level. For example, the goods may be transferred to level 1, where a transfer point may be provided at which the goods may exit the warehouse system 100. When retrieving of the goods is complete, the temporarily shifted cars 104 may be shifted back by one storage space in the opposite transverse direction Z (i.e., from lanes 1 to m−1 back to lanes 2 to m) as the cleared path is no longer needed. Lane 1 may thus be considered as a dedicated lane used for temporary storage of outermost cars 104 until the retrieving of goods is completed.

It will be understood that the above-described method of retrieving goods from the particular storage space 110 represents an effective way for clearing a required path since just a single driving step is needed to clear the required path. It will further be understood that it is generally conceivable that other relocation variants may be applied for clearing the respective path. This is generally possible because goods can be moved in both the longitudinal direction X and the transverse direction Z in the warehouse system 100. For example, it is conceivable that more than one lane among the plurality of lanes is empty for temporary storage of cars 104. Although this may result in non-optimal use of space in the warehouse system 100, it may increase throughput when a large number of goods is to be retrieved from the warehouse system 100 simultaneously. Also, it will be understood that, rather than a particular lane which is empty across all rows (such as lane 1 in the example described above), it may be sufficient that each row has at least one empty storage space, while the empty storage spaces of the different rows may be available on different lanes. In this case, provided that the cars 104 can be driven independently from each other, shifted cars 104 do not necessarily have to be shifted back to their initial position which may help to save energy.

Figure 3:
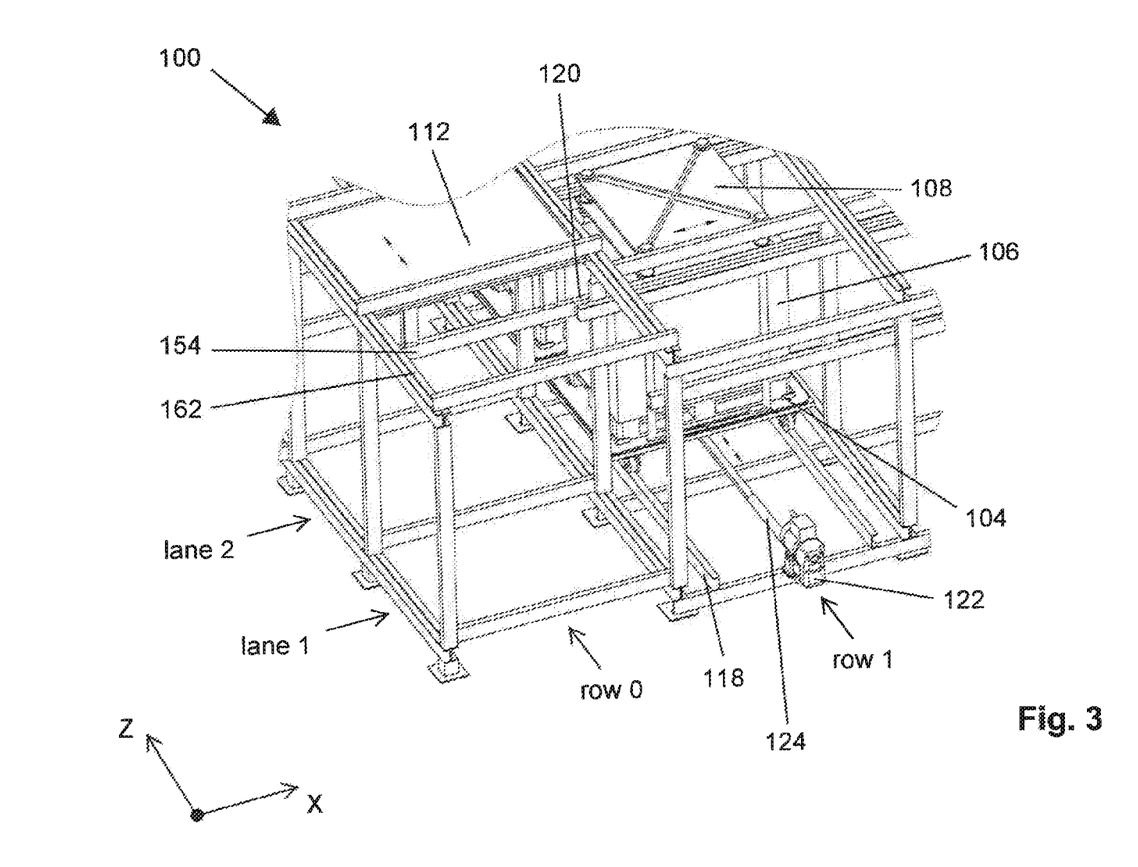
FIG. 3 illustrates a detailed perspective view of a portion of the warehouse system of FIG. 1.

FIG. 3 illustrates a detailed perspective view of a portion of the warehouse system 100 including rows 0 and 1 and lanes 1 and 2 on level 1. In the example shown, an outermost car 104 of row 1 (with goods 106 placed thereon) is positioned in lane 2, whereas lane 1 is empty. Further, a shuttle 108 is positioned over the outermost car 104 in row 1 and a docking station 112 is positioned in lane 2 of row 0 and, thus, ready to receive the shuttle 108. Respective double arrows indicate that the cars 104 in row 1 and the docking station 112 may be moved in the transverse direction Z and the shuttle 108 may be moved in the longitudinal direction X.

To realize such linear movability, the cars 104 are rail guided in rails 118 extending along row 1 in the transverse direction Z. The shuttle 108 is rail guided as well in rails 120 extending along lane 2 in the longitudinal direction X. To avoid crossings of the rails 118 and the rails 120, the rails 118 extend at the bottom of row 1 and the rails 120 extend at the top of lane 2. The shuttle 108 is configured to pick up the goods 106 from the car 104 by lifting the goods 106 to an extent that allows the goods 106 to be shifted in the longitudinal direction X in lane 2.

For driving the cars 104 in row 1, a driving device 122 is installed at the end of row 1, wherein the driving device 122 is coupled to the outermost car 104 of row 1 to drive the outermost car 104 in the transverse direction Z in row 1. In the normal storage state, all cars 104 in row 1 are releasably coupled to one another. Therefore, although, among the cars 104 in row 1, only the outermost car 104 is drivable by the driving device 122, the remaining cars 104 in row 1 are indirectly drivable via the outermost car 104. In the illustrated example, the driving device 122 is given as an electric motor capable of generating a reciprocating movement of the outermost car 104 via a coupling rod 124. When a path in a particular lane is to be cleared in row 1, those cars 104 in row 1 which are to be driven in the transverse direction Z to the outermost lane 1 may be uncoupled from the remaining cars 104 in row 1 so that only the uncoupled cars 104 are moved in the transverse direction Z, while the remaining cars 104 remain at their positions. In fact, such uncoupling may have been performed before step S202 in the example of FIG. 2, where those cars 104 in rows 1 to n−1 which have been positioned in lane m in the normal storage state may have been uncoupled from the cars 104 in lane m+1 so that the cars 104 could be moved in the transverse direction Z from lanes 2 to m to lanes 1 to m−1, respectively.

Figure 4:
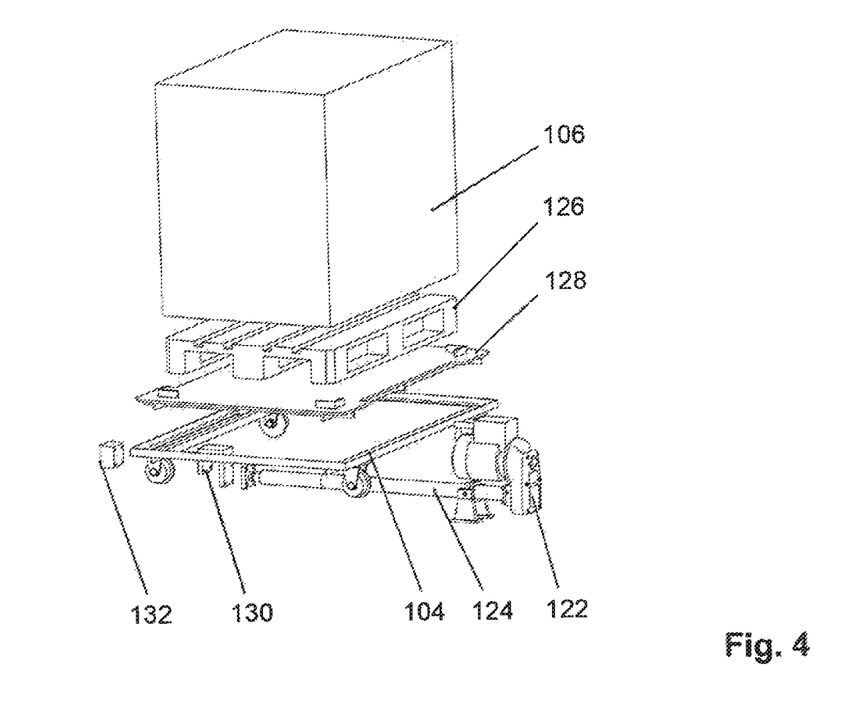
FIG. 4 illustrates a detailed exploded view of a car with a tray and palletized goods disposed thereon.

FIG. 4 illustrates a detailed exploded view of a car 104 with goods 106 disposed thereon. In FIG. 4, it is shown that the goods 106 may be placed on a pallet 126 which, in turn, may be disposed on a tray 128 which, again, may be removably placed on the car 104. When the shuttle 108 is positioned above the car 104 (as it is the case in FIG. 3, for example), the shuttle 108 may pick up the goods 106 from the car 104 by lifting the goods 106 to a certain extent. Respective gripping arms of the shuttle 108 may either grip the pallet 126 or the tray 128 for this purpose. FIG. 4 also shows the driving device 122 together with the coupling rod 124 which may be coupled to the outermost car 104 in a respective row via a bracket 130. The coupling between two adjacent cars 104 in a row, in turn, may be realized by a releasable magnetic connection (indicated by a magnet 132).

For any of the above-described relocation techniques, a control system of the warehouse system 100 (not shown), such as a warehouse management computer, for example, may provide corresponding control signals to the cars 104, the shuttles 108, the docking stations 112 and/or the driving devices 122 to control them as needed. Control signals may be transmitted via wireless transmission, for example. However, since, in the normal storage state, the cars 104 in a row may be coupled to one another, it is also conceivable to realize wire bound transmission of control signals from one car to another. Wire based power supply may be provided in the same manner. In order to uncouple a car 104 from an adjacent car, a corresponding uncoupling signal may be transmitted from the control system to the respective car.

It will further be understood that other driving mechanisms for the cars 104 (i.e., other than the mechanism which uses the driving devices 122) may be used. In one such variant, each car 104 may have a separate driving device installed at the car itself which may be controlled by the control system, e.g., through signals transmitted via wireless transmission. Further, while electric motors may be a feasible implementation for driving devices, other drive technologies may be employed, such as magnetic drives including magnetic linear drives, for example. Also, it will be appreciated that the coupling between two adjacent cars may not only be realized by magnetic connections, as indicated above, but may also be realized by appropriate mechanical connections, for example.

Figure 5:
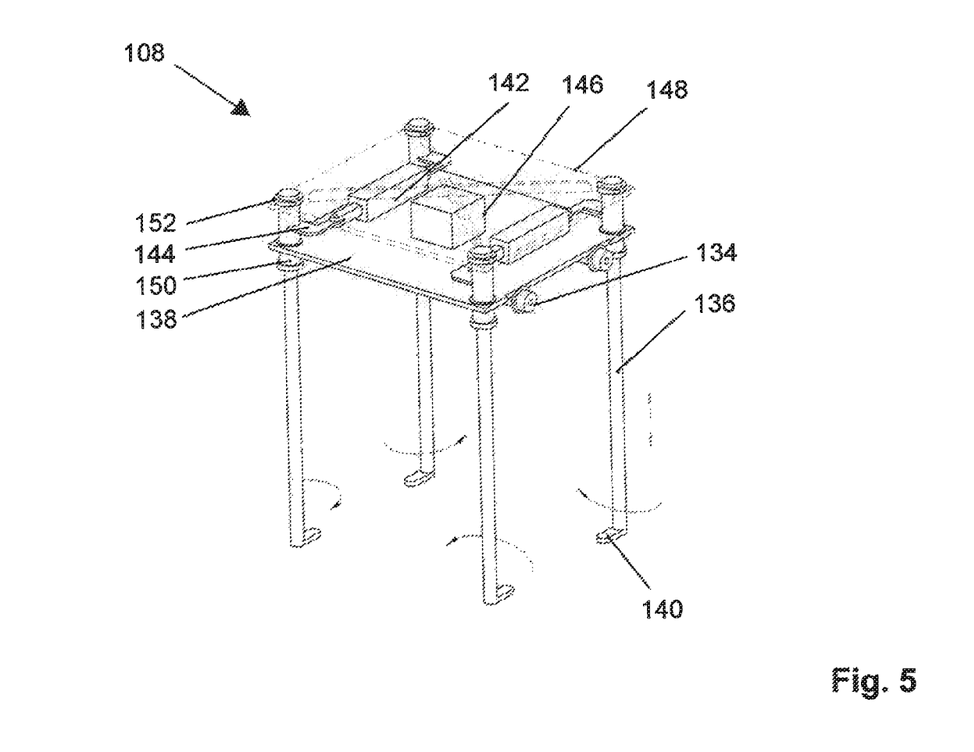
FIG. 5 illustrates a detailed perspective view of a shuttle for retrieving goods in the warehouse system of FIG. 1.

FIG. 5 illustrates a detailed perspective view of a shuttle 108 for retrieving goods in the warehouse system 100. As explained above, the shuttle 108 is generally configured to be movable along the lanes of the warehouse system 100 and to pick up goods 106 by lifting the goods 106 from the bottom of a storage space, e.g., from a car 104 which is movable along the bottom of a respective row, when the shuttle 108 is positioned above the goods 106 (e.g., over the car 104).

As shown in FIG. 5, the shuttle 108 comprises rollers 134 which are engageable in the rails 120 (cf. FIG. 3) extending at the top of the lanes of the warehouse system 100. For driving purposes, the shuttle 108 may comprise a driving device (not shown) which is configured to drive the rollers 134 to move the shuttle 108 along the respective lane. The driving device of the shuttle 108 may be controlled by the control system of the warehouse system 100, e.g., through signals transmitted to the shuttle 108 via wireless transmission. The driving device may be an electric motor, but may also be realized using other drive technologies, such as magnetic drives, for example.

In the illustrated example, the shuttle 108 comprises four rods 136 extending downwards from a lower platform 138 which function as gripping arms of the shuttle 108 for gripping the goods 106 and lifting the goods 106 from the bottom of the storage space. Each rod 136 comprises a jaw 140 at a lower end thereof, wherein the rods 136 are rotatable about their longitudinal axes so as to turn the jaws 140 to grip the goods 106. More specifically, the jaws 140 may engage the pallet 126 or the tray 128 (cf. FIG. 4) on which the goods 106 are disposed. Rotating directions of the rods 136 are indicated in FIG. 5 using respective arrows. The shuttle 108 further comprises actuators 142 which are configured to rotate the rods 136 so as to either grip or release the goods 106 (e.g., via the pallet 126 or the tray 128, respectively). In the example shown, two separate actuators 142 are provided, each of which is capable of generating a reciprocating movement and each of which is coupled via levers 144 to two of the rods 136 so as to rotate the two of the rods 136 simultaneously.

The shuttle 108 further comprises a lifting device 146 (shown schematically only) for lifting the goods 106 when the gripping arms 136 grip the goods 106. The lifting device 146 is arranged at the lower platform 138 and is configured to lift an upper platform 148 (indicated in dashed lines) with respect to the lower platform 138. In the example shown, the rollers 134 are mounted to the lower platform 138 and, therefore, when the rollers 134 engage the rails 120 extending at the top of a respective lane, the shuttle 108 is fixed in height and, when the upper platform 148 is lifted with respect to the lower platform 138, the upper platform 148 is lifted with respect to the bottom of the storage space as well. The rods 136 are fixed to the upper platform 148 and, therefore, when the upper platform 148 is lifted with respect to the lower platform 138, the rods 136 are lifted with respect to the bottom of the storage space. Further, the rods 136 are guided through sliding sleeves 150 which allow vertical movement of the rods 136 with respect to the lower platform 138. Stop rings 152 limit the vertical movement of the upper platform 148 to a predetermined lifting height. The lifting device 146 may be an electrically drivable lifting jack, for example.

When picking up the goods 106 from the bottom of the storage (e.g., from a car 104 positioned at the storage space), the shuttle 108 may be configured to lift the goods 106 to an extent that allows the goods 106 to be shifted by the shuttle 108 along the bottom of the respective lane. This extent may be a minimal distance which is sufficient to shift the goods along the lane without contacting elements at the bottom of the lane.

Figure 6:
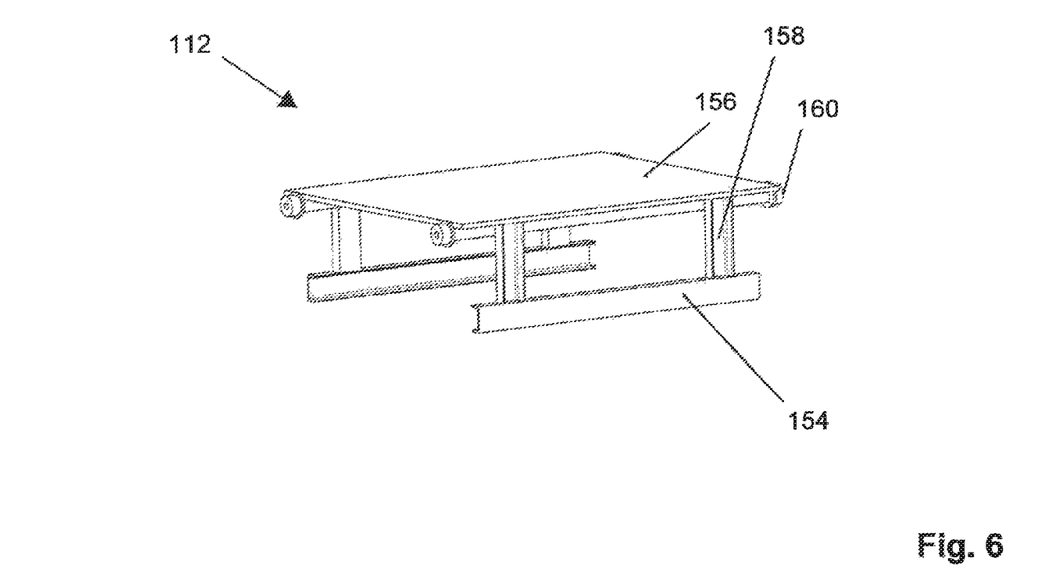
FIG. 6 illustrates a detailed perspective view of a docking station usable to transfer a shuttle into a transverse direction of the warehouse system.

FIG. 6 illustrates a detailed perspective view of a docking station 112 which is arranged in row 0 of the warehouse system 100. As described above, the docking station 112 may be configured to receive the shuttle 108 from a respective lane of the warehouse system 100 and transfer the shuttle 108 in the transverse direction Z to another lane on the same level or to one of the lifts 114 and 116. To be able to receive the shuttle 108 and transfer of the shuttle 108 in the transverse direction Z, the docking station 112 comprises rails 154 which are mounted to a platform 156 using brackets 158. As shown in FIG. 3, the rails 154 of the docking station 112 may be brought into alignment with the rails 120 extending at the top of a respective lane so that the shuttle 108 may be driven into the docking station 112. To be able to be moved in the transverse direction Z, the docking station 112 comprises rollers 160 which engage rails 162 (cf. FIG. 3) extending at the top of row 0 in the transverse direction Z. Similar to the shuttle 108, the docking station 112 may comprise a driving device (not shown) which is configured to drive the rollers 160 to move the docking station 112 along row 0 in the transverse direction Z. Also, the driving device of the docking station 112 may be controlled by the control system of the warehouse system 100, e.g., through signals transmitted to the docking station 112 via wireless transmission, for example.

As has become apparent from the above, the present disclosure provides techniques for automated warehouse systems which enable direct access to any desired storage space provided in the warehouse systems. The capability of accessing any goods at any time makes it possible to implement warehouse systems as single three-dimensional racks systems that utilize the space available in a warehouse almost entirely. Spaces between opposing rack fronts required for stacker cranes that supply opposing racks with goods may thus no longer be needed. Compact warehouse systems with improved space savings and improved accessibility of goods may thus be achieved.

It is believed that the advantages of the technique presented herein will be fully understood from the foregoing description, and it will be apparent that various changes may be made in the form, constructions and arrangement of the exemplary aspects thereof without departing from the scope of the disclosure or without sacrificing all of its advantageous effects. Because the technique presented herein can be varied in many ways, it will be recognized that the disclosure should be limited only by the scope of the claims that follow.

The invention claimed is:

1. A warehouse system comprising a three-dimensional matrix of storage spaces including a plurality of lanes extending in a longitudinal direction, a plurality of rows extending in a transverse direction, and one or more levels in a vertical direction, wherein, at each intersection of the plurality of lanes and the plurality of rows on a respective level, a storage space is formed,
wherein one or more cars employed to store goods at the storage spaces are arranged in at least one of the plurality of rows, the one or more cars in a respective row being drivable along the respective row in the transverse direction, wherein the number of the one or more cars in the respective row is less than the number of the plurality of lanes,
wherein the warehouse system comprises at least one shuttle different from the one or more cars and configured to pick up goods from the one or more cars in at least one of the plurality of lanes, wherein picking up the goods includes lifting the goods from the one or more cars to an extent that allows the goods to be shifted in the longitudinal direction of the at least one of the plurality of lanes, and wherein the at least one shuttle is drivable to shift the picked up goods in the at least one of the plurality of lanes along the longitudinal direction,
wherein the warehouse system comprises a control system which, in order to retrieve goods from a particular storage space, is configured to:
drive the one or more cars in at least one of the plurality of rows to clear a path in the lane of the particular storage space enabling the at least one shuttle to shift the goods in the lane along the longitudinal direction from the particular storage space to an end of the lane; and
drive the at least one shuttle to shift the goods along the cleared path from the particular storage space to the end of the lane.

2. The warehouse system of claim 1, wherein the storage spaces of the warehouse system include a plurality of levels in the vertical direction, and wherein the warehouse system comprises at least one lift drivable to transfer goods from one of the plurality of levels to another one of the plurality of levels.

3. The warehouse system of claim 1, wherein clearing the path in the lane of the particular storage space comprises:
driving, for each row from the end of the lane to the particular storage space, at least one car of the one or more cars in the respective row by at least one storage space in the transverse direction so that the lane of the particular storage space is cleared in the respective row.

4. The warehouse system of claim 3, wherein, among the plurality of lanes, a particular lane is empty before clearing the path in the lane of the particular storage space, and wherein driving the at least one car in the transverse direction shifts a particular car among the one or more cars in the respective row into the particular lane.

5. The warehouse system of claim 1, wherein, among the one or more cars in the respective row, a subset of cars is drivable in the transverse direction, wherein the subset of cars is releasably coupled to the remaining cars in the respective row.

6. The warehouse system of claim 2, comprising at least two groups of lifts, wherein one of the at least two groups of lifts is exclusively used for storing new goods in the warehouse system and another one of the at least two groups of lifts is exclusively used for retrieving stored goods from the warehouse system.

7. The warehouse system of claim 3, wherein, among the one or more cars in the respective row, a subset of cars is drivable in the transverse direction, wherein the subset of cars is releasably coupled to the remaining cars in the respective row.

8. The warehouse system of claim 4, wherein, among the one or more cars in the respective row, a subset of cars is drivable in the transverse direction, wherein the subset of cars is releasably coupled to the remaining cars in the respective row.

9. The warehouse system of claim 5, wherein an outermost car in the respective row forms the subset of cars.

10. The warehouse system of claim 5, wherein, before clearing the path in the lane of the particular storage space, the one or more cars in the respective row are releasably coupled to one another and, when clearing the path, the at least one car which is driven in the transverse direction is uncoupled from the remaining cars in the respective row while the remaining cars remain at their positions.

11. The warehouse system of claim 9, wherein, before clearing the path in the lane of the particular storage space, the one or more cars in the respective row are releasably coupled to one another and, when clearing the path, the at least one car which is driven in the transverse direction is uncoupled from the remaining cars in the respective row while the remaining cars remain at their positions.

12. The warehouse system of claim 1, wherein the one or more cars arranged in a respective row are rail guided in the transverse direction using rails extending at the bottom of the respective row and the at least one shuttle is rail guided in the longitudinal direction using rails extending at the top of the plurality of lanes.

13. The warehouse system of claim 12, wherein the at least one shuttle is configured to pick up goods from a car of the one or more cars in a respective row by lifting, when the shuttle is positioned above the car, the goods to an extent that allows the goods to be shifted in the longitudinal direction of the respective lane.

14. The warehouse system of claim 13, wherein the goods are placed on a removable tray on the car, and wherein the at least one shuttle comprises one or more gripping arms extending downwards for lifting the tray from the car.

15. A method for retrieving goods from a particular storage space in a warehouse system comprising a three-dimensional matrix of storage spaces including a plurality of lanes extending in a longitudinal direction, a plurality of rows extending in a transverse direction, and one or more levels in a vertical direction, wherein, at each intersection of the plurality of lanes and the plurality of rows on a respective level, a storage space is formed, wherein one or more cars employed to store goods at the storage spaces are arranged in at least one of the plurality of rows, the one or more cars in a respective row being movable along the respective row in the transverse direction, wherein the number of the one or more cars in the respective row is less than the number of the plurality of lanes, the warehouse system comprising at least one shuttle different from the one or more cars and configured to pick up goods from the one or more cars in at least one of the plurality of lanes, wherein picking up the goods includes lifting the goods from the one or more cars to an extent that allows the goods to be shifted in the longitudinal direction of the at least one of the plurality of lanes, and wherein the at least one shuttle is movable to shift the picked up goods in the at least one of the plurality of lanes along the longitudinal direction, the method comprising:

moving the one or more cars in at least one of the plurality of rows to clear a path in the lane of the particular storage space enabling the at least one shuttle to shift the goods in the lane along the longitudinal direction from the particular storage space to an end of the lane; and     moving the at least one shuttle to shift the goods along the cleared path from the particular storage space to the end of the lane.

16. The method of claim 15, wherein clearing the path in the lane of the particular storage space comprises:

moving, for each row from the end of the lane to the particular storage space, at least one car of the one or more cars in the respective row by at least one storage space in the transverse direction so that the lane of the particular storage space is cleared in the respective row.

17. The method of claim 16, wherein, among the plurality of lanes, a particular lane is empty before clearing the path in the lane of the particular storage space, and wherein moving the at least one car in the transverse direction shifts a particular car among the one or more cars in the respective row into the particular lane.

\* \* \* \* \*